United States Patent [19]

Cohen et al.

[11] 4,132,219

[45] Jan. 2, 1979

[54] EXTRA-FOCAL, CONVECTIVE SUPPRESSING SOLAR COLLECTOR

[76] Inventors: Jeffrey M. Cohen; Marion D. Cohen, both of Parkway House, 2201 Pennsylvania Ave., Philadelphia, Pa. 19130

[21] Appl. No.: 789,793

[22] Filed: Apr. 22, 1977

Related U.S. Application Data

[63] Continuation-in-part of Ser. No. 674,060, Apr. 5, 1976, Pat. No. 4,022,188.

[51] Int. Cl.² .................................................. F24J 3/02
[52] U.S. Cl. ...................................... 126/270; 126/271
[58] Field of Search ................. 126/270; 237/271, 1 A

[56] References Cited

U.S. PATENT DOCUMENTS

| 3,815,574 | 6/1974 | Gaydos, Jr. | 126/271 |
| 3,923,039 | 12/1975 | Falbel | 126/271 |
| 3,994,435 | 11/1976 | Barr | 237/1 |
| 4,015,585 | 4/1977 | Fattor | 126/271 |

*Primary Examiner*—Kenneth W. Sprague
*Attorney, Agent, or Firm*—Benasutti Associates, Ltd.

[57] ABSTRACT

A novel type of solar collector is disclosed comprising an absorber within a downwardly directed cavity, a reflector for reflecting solar radiation up into the cavity and onto the absorber, and a light transmitting sheet which allows solar rays to pass therethrough. The solar collector has the property that convective loss is suppressed.

7 Claims, 6 Drawing Figures

EXTRA-FOCAL, CONVECTIVE SUPPRESSING SOLAR COLLECTOR

CROSS REFERENCE TO RELATED APPLICATIONS

This application is a continuation-in-part of my prior co-pending application U.S. Ser. No. 674,060, filed Apr. 5, 1976, now U.S. Pat. No. 4,022,188 entitled, "High Efficiency Solar Collector", which application is incorporated by reference as if fully set forth herein.

BACKGROUND OF THE INVENTION

The present apparatus relates to energy collecting means, and more particularly to an improved solar energy collector which concentrates, absorbs and transfers heat to a fluid.

The practical, efficient utilization of solar energy has for generations been the object of much effort and study. In recent times, as the hazards of air pollution due to the use of fossil fuels have become apparent, along with the potential hazards of nuclear energy sources, considerable attention has been focused upon devising economical and practical means for collecting energy of solar rays. Even more lately, shortages of petroleum products, along with the rapidly rising cost thereof, has lent new urgency to the search for practical means for making use of solar energy.

To date, although much effort has been expended in the development of prototype and experimental solar energy collecting and storage apparatus, none have attained any degree of practical, economic success. The expense and/or inefficiency of construction of any apparatus so far devised has inhibited the development of practical solar energy collection means. Ordinarily, solar collectors comprise a metallic plate or the like enclosed by a glass cover, and solar rays heat the metal therebeneath. Energy from the heated metal is then collected by a heat transfer fluid, such as air or water which is passed beneath or over the metal whereby it is heated. The heated fluid is then stored until needed, then pumped through other heat transfer devices, e.g., radiators, which extract heat energy from the fluid.

The principal difficulty with prior art solar energy collection devices has been convective loss. This important heat loss factor in solar collectors stems from the transfer of heat by moving air. If high temperature solar collector operation is to become practical, convective energy loss must be minimized. Previous attempts to control convection, in the region between the absorber plate and the glass sheet or between sheet layers, involve: (1) evacuation, (2) use of a honeycomb structure, (3) use of a high molecular weight inert gas, or (4) limitation of the temperature difference between the absorber plate and the sheet.

Each of these attempts is very costly and is plagued with serious difficulties. (1) Some of the difficulties with evacuated collectors are: (a) they are prone to spectacular implosions induced by vandalism, hail, etc.; (b) they must not collapse when subjected to atmospheric pressure; (c) the enclosure and sheet geometry, necessary to resist atmospheric pressure, results in high reflective losses; (d) it is very difficult to maintain a high vacuum over an extended time period; (e) as the temperature difference increases or as the linear dimension of the evacuated region is made larger, a higher and higher degree of evacuation is necessary to prevent reestablishment of convective flow. (2) Some disadvantages of honeycomb structures are: (a) they are fragile and costly; (b) they absorb solar energy before it can reach the black absorbing element; (c) if they become dirty, there will be a large increase in the proportion of solar energy wasted by absorption in the honeycombs; (d) if the temperature differential across the honeycomb is not sufficiently small or if the sheet spacing is large, convective flow can be reestablished despite the honeycomb; (e) if the collector heat transfer fluid flow should stop, honeycombs have been known to melt, necessitating costly and time consuming repairs. (3) Some difficulties with an inert high molecular weight gas are: (a) it must be contained without loss, and without air seeping in, for many years; (b) the gas is more difficult to obtain than air; (c) if the sheet spacing is large, the use of such a gas gives essentially no advantage over air; (d) if the temperature difference is not small, convective flow will be fully established despite the inert gas. (4) Attempting to limit the temperature difference between the absorber plate and the sheet has the difficulty that it is not always possible to carry out, e.g., when the ambient temperature is low (e.g., on cold days) or if the required heat transfer fluid temperature must be high (e.g., for absorption air conditioning). Hence, this method can not reduce convection by an appreciable amount.

Because of there difficulties with controlling convection, many suppliers of solar collection apparatus have chosen to use apparatus prone to convective loss.

The maximum temperature of such apparatus is limited to relatively low values. Typically such values have been below 150° F. Accordingly, the stored heat transfer fluid can be maintained at no more than 150° F. or thereabouts and usually much less.

A still further difficulty has been that the sun's orientation with respect to some collectors is at an optimum for only one or two hours in a ten-hour day. Accordingly, for a ten-hour period of sunlight, a large percentage of the available solar energy may not be used.

In order to overcome this problem, practitioners have devised various types of reflectors for use in conjunction with heat absorbers. Typically, the reflectors are pivoted or swiveled so as to maintain the sun's rays focused upon the absorptive apparatus. Said reflectors are commonly surfaces of rotation such as sections of spheres or paraboloids. However, the cost and complexity of these movable apparatus, hereinafter termed "steerable reflectors", is often prohibitive. Further, like any complex movable object, they are susceptible to wear and breakage so that they decrease the overall reliability of the heating system. Further, additional energy is required to drive these steerable reflectors. Accordingly, it will be appreciated that it would be highly desirable to provide an improved absorptive apparatus which absorbs solar energy with relatively little loss and does not require diurnal tracking of the sun. This is not possible with conventional focusing techniques. Also, the efficiency of the apparatus in absorbing diffuse light is much greater than that of focusing collectors.

SUMMARY OF THE INVENTION

The present invention discloses a novel nonfocusing solar collector which in the preferred embodiment achieves a high degree of concentration while minimizing convective heat loss. In one embodiment, a wide solar acceptance angle is achieved wherein virtually all of the incident radiation is collected after a single bounce from the reflective element, and wherein the extra-focal positioning of the absorption means facilitates the nonfocusing diurnal collection of incident solar radiation. In accordance with this embodiment, the absorption means is suspended intermediate over the reflecting element such that rain will wash through and over the main reflecting element, thereby obviating any necessity for routinely cleaning same.

In a preferred embodiment, a generally planar, horizontally disposed absorption means having an insulated outer shell is provided which defines a large aperture in the lower surface thereof. The aperture is closed by a light transmitting plate. An absorber is disposed above the plate within the insulated shell to absorb the the incident solar radiation and to heat a fluid. An elongate reflector having a curved cross-section, such as a parabolic cross-section, is disposed beneath the absorption means for directing the sun's rays upwardly into the absorber. In the preferred embodiment solar collector referred to above, a novel method of suppressing convection is disclosed. Rather than attempting to reduce the negative temperature gradient ($dT/dz < 0$) in the region surrounding the absorber to a value small enough to satisfy a criterion involving Grashof and Prandtl numbers, applicants disclose an apparatus which gives a positive gradient temperature. In the preferred embodiment apparatus, the colder sheet is below the warmer absorbing element. Such a configuration gives a positive temperature gradient and gives rise to no convective instability. Hence, free convective currents are not established.

One purpose of the sheet is to suppress forced convection driven by prevailing winds. It also serves the usual purpose of a filter for transmitting solar radiation in the optical and ultravoilet range, but reflecting back into the cavity infrared radiation produced by the black absorbing element. If the sheet were not used, prevailing winds could break up the stable stratified air configuration in the cavity and give rise to natural as well as forced convection.

It is preferred that the outermost sheet be rigid or be under sufficient tension so that prevailing winds will not cause it to move appreciably. If displacement modes of oscillation were set up in the sheet, they could drive forced convection currents within the cavity. If the sheet does not move, such forced convective modes will not be driven and hence will be suppressed.

One purpose of the insulation above the absorbing element and extending down along the sides is to suppress the natural convection which would occur in air above a hot object because of the convective instability discussed above. Hence the absorpiton means disclosed herein effectively eliminates convective heat losses in applicants' solar collector.

In the preferred embodiment reflector system, the solar radiation is directed up into the bottom of the absorber. A number of reflector shapes have been developed for different purposes. For winter space heating only, shapes have been developed which collect the solar radiation during the cold months when heating is desired and automatically stops collecting in the summer when no heating is desired; this is done without moving parts. For hot water heating, reflector shapes have been developed which collect solar radiation all year, and automatically adjust (without moving) for the reduction in solar insolation during the coldest months of the year. Still other shapes have been developed which give higher temperatures in the summer for absorption air-conditioning purposes (300° to 700° F. without coolant) and lower temperatures in the winter for space heating (200° to 500° F.).

When using a parabolic reflector with the parabolic axis above the solar elevation angle, all solar rays incident on the reflector will pass through an aperture which includes the region from the parabola to the focus after one or more reflections. As the difference between the solar elevation angle and the parabolic axis angle increases, the number of reflections increases. Since no reflective material is perfect, some energy is lost with each reflection and so it is desirable to minimize the number of reflections. One embodiment of applicants' invention accomplishes this by orienting the parabolic axis at an angle below the solar elevation angle and positioning the absorber acceptance aperture to include a region starting from the parabolic focus and extending in a direction away from the parabolic vertex. This will minimize the number of reflections from reflector to absorber.

It is accordingly an object of the present invention to provide an improved absorptive means not plagued with convective loss for use with solar energy collection systems.

Another object of the invention is to provide a solar energy collecting apparatus which is stationary and does not have to be steered.

Yet another object of the invention is to provide a solar energy collecting reflector in combination with an absorptive apparatus which makes full use of the sun's rays over an extended period of time.

Another object of the invention is to provide a solar energy collecting apparatus which minimizes the number of reflections from reflector to absorber.

Another object of the present invention is to provide a solar energy collecting apparatus which is non-focusing.

It is an object of the present invention to provide a solar energy collecting reflector with a simple and substantially maintenance free configuration.

This and other objects of our invention will become apparent from the following description with reference to the accompanying drawings.

BRIEF DESCRIPTION OF THE DRAWINGS

While the specification concludes with claims particularly pointing out and distinctly claiming the subject matter which is regarded as the invention, it is believed that the invention will be better understood from the foregoing description of a preferred embodiment taken in conjunction with the accompanying drawings in which:

DESCRIPTION OF THE PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

Figure 1:
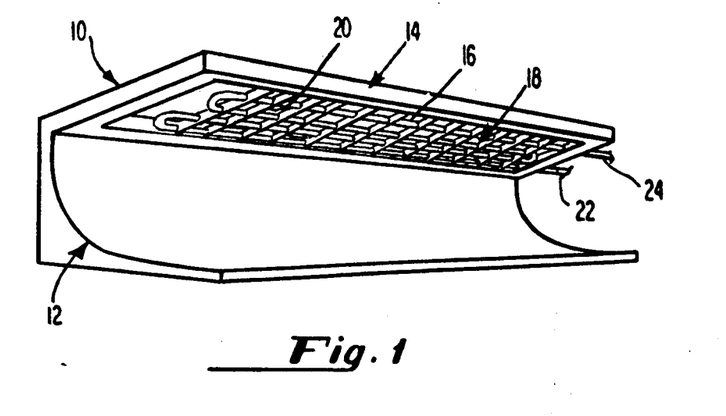
FIG. 1 is an oblique view of apparatus constructed according to the teachings of the present invention.
Figure 2:
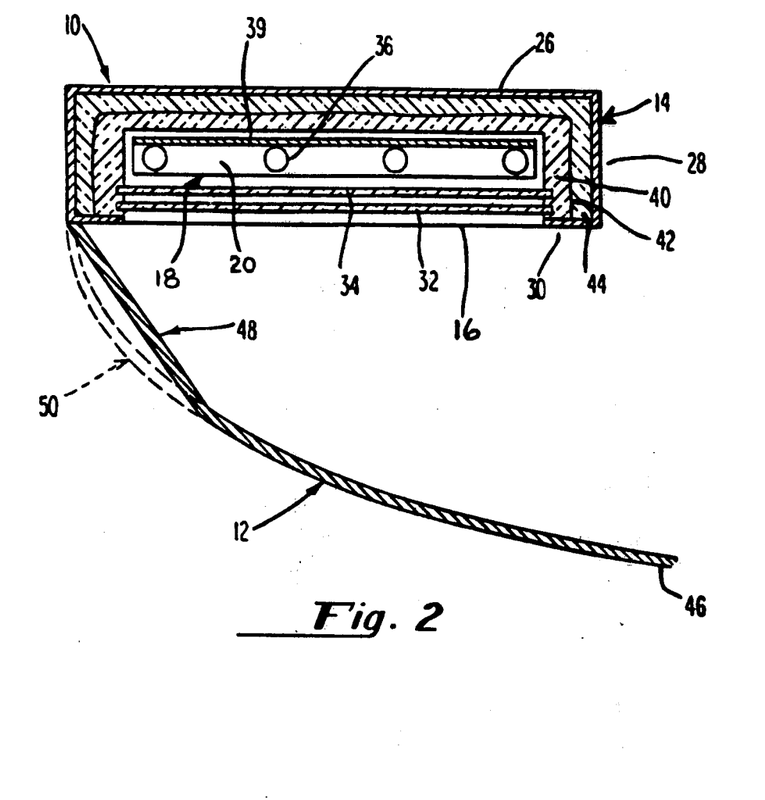
FIG. 2 is a transverse cross-section of an apparatus of the type shown in FIG. 1.

Referring now to FIGS. 1 and 2, a solar energy collecting means is shown which comprises a preferred embodiment absorption means designated generally 10 in combination with a reflecting element designated generally 12. The absorption means comprises an extended, horizontal element designated generally 14 exhibiting a generally planar structure. The upper and outer surface of the absorption means, not visible in FIG. 1, may be flat and imperforate having no solar energy collection functions. Wood, sheet metal or any other substantially rigid material may be selected for use. Within the outer and upper surface of shell 14 of the absorption means is a layer which may be formed from any appropriate insulating material. The insulating material terminates about the lower edges of the absorption means to define an enlarged aperture 16 which extends across at least some portion of the lower surface of the absorption means. The aperture is closed by at least one light transmitting sheet, through which can be seen an absorber, designated generally 18 which can comprise roll-bonded copper or some other type tubing and which can be coated with a selective coating to absorb solar rays with high absorptivity and reradiate infrared rays with low emissivity, etc.

An inlet duct 22 and outlet duct 24 allow heat transfer fluid to be pumped through the absorber 18, and to an appropriate reservoir or heat sink. In a preferred embodiment these inlet and outlet ducts should exit through the rear of the absorption means so as not to block any incident solar rays.

Reflecting element designated generally 12 is horizontally elongate, as is the absorption means. The transverse cross-section of the reflecting means exhibits a generally flat, conic-section, such as a portion of a parabola, or any other curved shape. The preferred embodiment reflecting means may be considered to be generated by the translation of a parabolic arc along a horizontal line parallel to the long axis of the absorption means to form a section of a parabolic cylinder.

It should be understood that while the term "parabolic" is used, functionally similar curvatures may be selected for any given use; or, alternatively, a generally similar configuration may be formed by a plurality of aligned, flat surfaces, each inclined slightly with respect to the next so as to form the desired reflecting surfaces. The reflecting element may be constructed of any suitable material, the surface thereof being highly reflective. Such a surface may be formed from aluminum, alzak, metalized plastic or any one of a number of appropriate materials.

Referring now to FIG. 2, there is shown a transverse cross-sectional view of the apparatus of FIG. 1, illustrating the details of the construction thereof. The absorption means 10 advantageously comprises a shell 14 of a thin, rigid material such as metal or the like. The shell forms an extended upper surface 26 and side surfaces 28 of relatively small depth, so that the overall form of the absorption means is an extended planar element. The shell includes lower portions 30 which define an aperture 16 in the lower surface of the absorption means. The aperture is closed by a light transmitting sheet 32, which is disposed below the absorber 18. Convective loss is minimal because the hotter absorber 18 is disposed above the colder glass plate 32. If desired, a plurality of sheets such as second sheet 34 may be added, which will further reduce loss of heat from within the cavity because of the air trapped between the pair of sheets 32 and 34.

Sheets made of glass are suitable for use in closing the aperture, as they transmit the greater part of solar radiation, but are opaque to infrared radiation. Ordinary crown glass, for example, may be used as well as borosilicate crown glass and flint glass. Borosilicate crown glass has the advantage of exhibiting a relatively large coefficient of transparency for visible and near ultraviolet radiation. Further, to reduce the reflection of impingent radiation, the glass sheet may be coated with a material such as magnesium fluoride to reduce the reflectivity of the surface. The glass sheets 32 and 34 act as a filter which transmits the desired solar radiation entering the absorber and traps the infrared radiation generated within the absorption means. Appropriate insulation is provided about the periphery of the glass sheets to aviod unwanted heat transfer to the shell which supports them.

Insulating means are provided within the shell, lining the upper and side surfaces thereof to define a cavity within the shell, above the light transmitting sheets 32 and 34. Extending within the cavity is the preferred embodiment absorber 18 comprising a plurality of ducts 36 which may, for example, comprise serpentine elongated lengths of tubing 36. As was set forth with respect to FIG. 1, appropriate heat transfer fluid is pumped through the tubing to collect heat absorbed thereby, then pumped to a remote utilization or storage means.

In the preferred embodiment absorber 18, black vertical plates 20 extend transversely across the duct means, and effectively serve to increase the surface thereof. Backing plate 39 extends horizontally behind tubes 36 and is heated by that radiation which bypasses tubes 36 and plates 20. The heat is then contained within the enclosed cavity and ultimately absorbed by the fluid within tube 36. In this manner a larger surface is presented to solar radiation entering the absorption means through glass sheets 32 and 34.

In a preferred embodiment, the insulation comprises a plurality of layers of insulating material. In order to optimize the construction of the apparatus, and to minimize cost, the innermost layer of insulation 40 may be of a high-temperature insulating material. By this is meant an insulation which will withstand temperatures in excess of 600° F. without noticeable deterioration. Glass wool, asbestos, and other similar materials may be used.

Surrounding the innermost layer of insulation is a separator 42 of aluminum foil. The separator serves to reflect impingent radiation to further reduce convection, and to act as a vapor barrier, aiding in the activity of the insulation layers. An outermost layer 44 of insulation is provided, and may be of a low-temperature material, that is, one which need not withstand temperatures in excess of 600° F. An inexpensive foam material such as urethane may be selected for this purpose in regions where the temperature is below approximately 250° F.

Extending beneath the absorption means is reflecting element 12. As stated above, the preferred embodiment reflecting element exhibits a cross-sectional configuration approximating that of a parabolic arc or some other curved shape. The outermost lip 46 of the parabola may in this embodiment advantageously extend from under the absorption means. Further, the vertex portion of the reflecting means 12 may depart from the actual parabolic vertex shown as dotted line 50 to comprise a chord 48 of the parabolic arc. In this vein it will be appreciated that the entire parabolic surface can be approximated by a series of flat chordal segments such as the solid chord 48.

Figure 3:
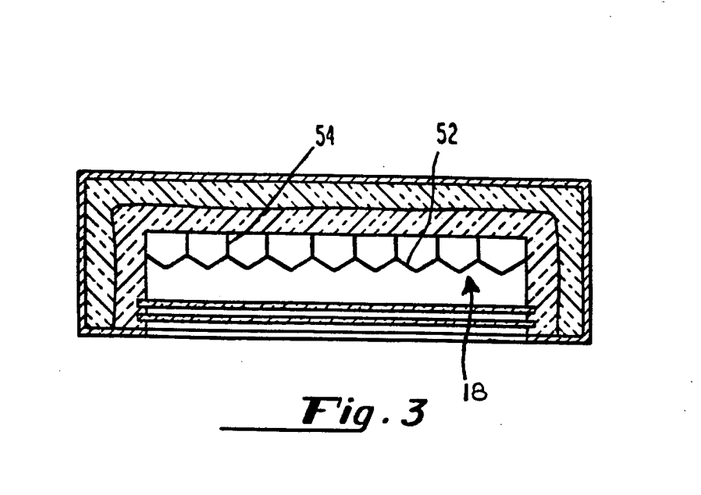
FIG. 3 is a transverse cross-section of another embodiment of the absorption means section of the apparatus.

FIG. 3 discloses an alternative embodiment of the inventive absorption means 18, wherein the duct means is formed by a cavity immediately above a corrugated black metal plate 52. Extending transversely across plate 52 are a series of vertically-disposed, parallel metal plates 54. The corrugations of plate 52 and the vertically disposed plates 54 serve to extend the effective surface of the duct means to improve the heat transfer characteristic thereof. Circulated air may be directed back and forth by the vertical plates in the region above plate 52, absorbing heat from contact with the plates and being pumped to a distant site for utilization or storage. In such a case additional rigid duct surfaces are unnecessary to separate the moving air from the surrounding insulation material. If a liquid such as water is selected for use as the heat transfer medium, it will, of course, be necessary to line the insulation disposed above plates 52 and 54 with an appropriate material for isolating the fluid from the insulation.

Figure 4:
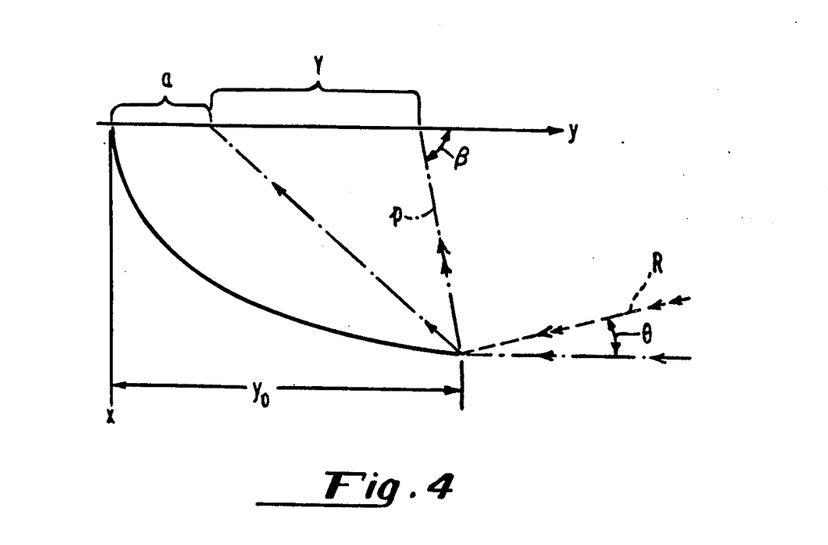
FIG. 4 is a diagram illustrating the geometric relation of certain of the components of a preferred embodiment.

FIG. 4 shows in detail the geometry of the inventive apparatus. The cross-section of the parabolic cylindrical surface of reflecting element 12 is presented as a parabolic arc. For purposes of reference, the arc is shown in relation to a pair of cartesian coordinate axes x and y and has its focus located a distance "a" from its apex. For ease in explanation, the x axis is shown as extending vertically while the y axis is horizontal, and generally perpendicular to the long axis of the reflecting surface generated by translating the parabolic arc. The overall horizontal dimension perpendicular to the translation direction of the arc or lateral width of the reflector surface is denoted by $Y_0$, while the absorption means extends in the same direction for some distance Y past the focal point. The inner edge of the absorption means for the embodiment of FIGS. 1 and 2, may then be at any point between the apex of the parabola and a distance Y + a therefrom. However, the total lateral width of the absorption means must be at least equal to the distance from the vertex of the reflector parabola to its focus. Preferably, the absorption means exhibits a width which is twice this distance in this embodiment.

A line p connects the outermost edge of the absorption means to the outermost edge of the reflecting surface, defining an angle β with the horizontal as shown. As the parabola may be considered to be defined by the expression $y = x^2/4a$ the focus of the parabola is at a distance "a" from the origin of the coordinate system. In a preferred embodiment of FIGS. 5 and 6 "a" represents the distance from the origin to the inner edge of the absorption means, or for the embodiment of FIGS. 1 and 2, to a point along the bottom of the absorption means. Finally, for purposes of illustration, a solar ray R is shown striking the reflective surface at an angle θ to the horizontal.

A light ray which strikes the reflective surface a distance y from the origin will strike the absorption means a distance Y + a therefrom where $$Y = a(1 + ya^{-1})^2 \sin\theta \, [(ya^{-1} - 1)\sin\theta + 2(y/a)^{1/2}\cos\theta]^{-1}$$

with "a" being the focal length of the parabolic surface and y being the horizontal distance from the point 0 to the vertex end of the parabolic surface. Here θ is the maximum angle defined by the sun's rays during the cold months of the year, when a maximum amount of solar energy collection is desired. The length of the absorber (along the translation direction of the arc) is the same as that of the reflector, as can be seen from FIG. 1, and the width thereof is Y or, alternatively, $Y = a$.

Concentration of the solar energy may be expressed in terms of p/Y where p is represented by the appropriately-labeled line in FIG. 4 p/y is equal to $$\frac{[(Ya^{-1} + 1 - ya^{-1})^2 + 4ya^{-1}]^{1/2}}{Ya^{-1}}$$

For solar radiation striking the reflective surface at an angle θ which is equal to zero, the concentration of solar rays is infinite. As the angle θ increases, the concentration of energy decreases. It can be shown for instance that for collection apparatus arranged as in FIG. 4, which dimensions are chosen such that y/a = 3, the concentration p/Y is approximately equal to 3.3 for an angle θ of 15°, and approximately 1.7 for an angle θ of 30°.

The angle β that the line p forms with the horizontal may be expressed as $$\tan\beta = -2(y/a)^{1/2}[1 + Ya^{-1} - ya^{-1}]^{-1}$$

For a value of y/a of 3 and a value Y/a of 2, it can accordingly be shown that β equals 90°, for an angle θ of 30°. For values of y/a of 5 and Y/a of 3, the angle β is 78°.

If the reflector shape has the cross-section of a parabolic arc and the parabolic axis is above the solar elevation angle, then an absorber can be placed in a position where the acceptance aperture includes the region from the parabola to the focus and all solar rays incident on the parabola will enter the absorber after one or more reflections. This is true for all solar elevation angles equal to or less than that of the parabolic axis. For example, if the parabolic axis is set equal to or greater than the maximum yearly solar elevation angle, then the reflector need never be moved but will still direct all incident solar rays into the absorber. Working models exhibit the predicted behavior. As the difference between the solar elevation angles and the parabolic axis angle increases, the number of reflections increases. Because no reflective material is perfect, it is desirable to minimize the number of reflections, thereby minimizing the loss. One way this can be accomplished is to move the reflector from season to season and thereby change the parabolic axis angle. By maintaining a small difference between parabolic axis and solar elevation angles, the number of reflections and the corresponding reflection losses can be minimized.

A novel way in which the above mentioned reflector shape can be employed to minimize the number of reflections without diurnal tracking of the sun is to orient the parabolic axis at an angle below the solar elevation angle. With proper choice of design parameters it is not necessary to track the sun and for a large number of angles only one reflection is needed to capture the solar energy. The collector can be left in a fixed position throughout the year or it can be adjusted seasonally to optimize collection and to maintain a high concentration. For example, consider a parabolic arc with equation $y = x^2/4a$ and with $x \leq 0$. Solar rays approaching the arc from large positive x and y and forming an angle $\theta_o$ with the parabolic axis and striking the arc with y values between $y_1$ and $y_2$ will be so reflected that the reflected rays cross the parabolic axis between the focal length "a" and $y_o \geq$ "a". Furthermore, if the incident angle $\theta$ is less than $\theta_o$, but greater than or equal to 0°, then the reflected rays also will cross the parabolic axis between the focus and $y_o$. If an absorption means is so positioned that its acceptance aperture includes the region between $y_o$ and a, then all rays with $O \leq \theta \leq \theta_o$ and $y_1 \leq y \leq y_2$ will be captured by the absorber.

The concentration C is the ratio of the collector acceptance aperture to the absorber acceptance aperture and is given by the lesser of the two expressions $| \overline{A} \times \overline{u} | (y_o - a)^{-1}$ & $| \overline{B} \times \overline{u} | (y_o - a)^{-1}$ where $\overline{u}$ is a unit vector tangent to the solar ray, $\overline{A}$ is a vector connecting the points $(y_2, x_2)$ and $(y_o, 0)$, while $\overline{B}$ is a vector connecting the points $(y_2, x_2)$ and $(y_1, x_1)$.

The apparatus consisting of a reflector of the above type and an absorption means positioned in the prescribed manner, can give high concentration (2, 3, 5, 10, etc.) without diurnal tracking of the sun. With conventional imaging techniques, this is impossible.

Figure 5:
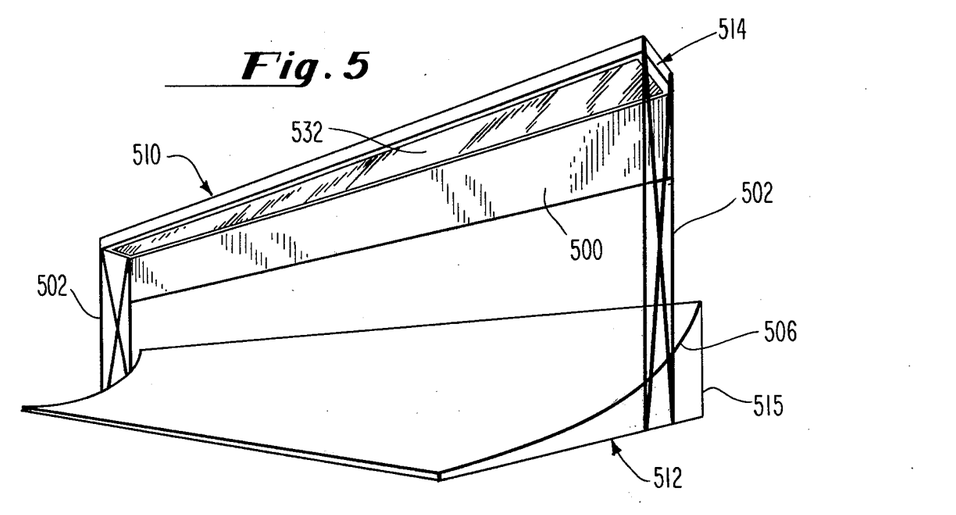
FIG. 5 is an oblique view of an alternate embodiment of the apparatus constructed according to the teachings of the present invention.

FIG. 5 shows an alternate embodiment of a solar energy collecting apparatus to implement this approach comprising: an absorption means designated generally 510 and similar in design to those discussed for FIGS. 1, 2 or 3. The absorption means further comprises a shell designated generally 514; a light transmitting sheet 532; insulation means and absorber means (not shown) within the cavity formed by shell 514. The downward direction cavity with heat insulation above the abosrber within the cavity and with sheet means at least partially below is designed to eliminate or minimize convective heat loss. Also shown in FIG. 5 is the downwardly directed secondary reflector 500 which extends a portion of the cavity below said light transmitting sheet 532.

Figure 6:
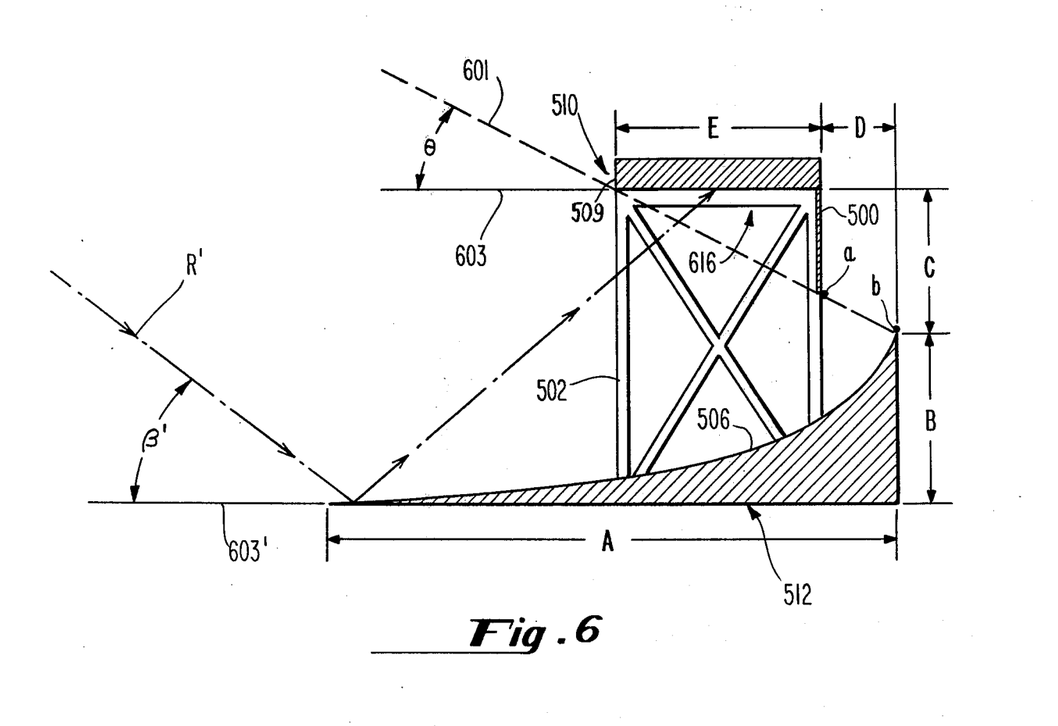
FIG. 6 is a transverse cross-section of the apparatus of FIG. 5.

The alternate embodiment reflector means designated generally 512 lies directly below the absorption means 510 on a pedestal or base 515 having an upper or top surface 506. In the embodiment of FIGS. 5 and 6, the top surface portion of the reflecting element is in the shape of a portion of a parabolic cylinder. The supports 502 rigidly hold the absorption means 510 in position above the reflecting surface 506, the absorption means 510 being disposed generally above said reflecting element intermediate said ends of said pedestal portion 515.

In the embodiment of FIG. 6, the parabolic axis, indicated by the dashed line 601, makes an elevation angle $\theta$ with the horizontal 603, which angle, $\theta$, is always greater than or equal to 0°, and less than the solar elevation angle, $\beta'$, shown by the angle formed between the solar ray, R', and the horizontal 603'. Elevation angles greater than 0° being defined as angles above the horizons 603 and 603'. The ray, R', strikes the reflector 512 once before entering the cavity of the absorption means 510. In order to capture most of the solar rays striking the reflector 512 with only one bounce or reflection, the absorber acceptance aperture designated generally 616 is disposed generally adjacent to the axis of the parabola formed by the reflecting element and extends from the parabolic focus or focal point "a" therealong for a preselected distance outwardly along said axis away from the parabolic vertex "b".

FIG. 6 shows the secondary reflecting element 500 extending perpendicularly downward from the main portion of the absorption means 510. The downward direction of the secondary reflector 500 extends so far as to intersect the parabolic axis 601 near the focal point "a". In this case the acceptance aperture of the absorption means 510 extends from the lower end of the secondary reflector 500 along the axis 601 to the outer edge 509 of the absorption means 510. In this way, the secondary reflector extends a portion of the cavity below the horizontal sheet means 532 of FIG. 5. The sheet means 532 extends across at least a portion of the cavity defined by the upper portion of the absorption means 510 and the secondary reflector 500.

The size of the absorber acceptance aperture 616 determines the collector acceptance angle and the concentration as can be verified via programmable calculator, computer, or measurements on working models. Hence, the advantage of this configuration is that the number of reflections is small and thus reflection loss is minimized with little or no need for adjusting the positioning of the apparatus.

The alternate embodiment solar energy collecting apparatus of FIGS. 5 and 6 provides a substantially maintenance free design. The vertical height of the reflecting element decreases continuously along the horizontal dimension of the reflecting element starting from the vertex end of the reflecting element with height B and proceeding to the other end of the reflecting element a horizontal distance A away. As rain falls on the apparatus it washes through across the entire surface 506 of the reflecting element to cleanse the surface. Water and dirt will roll to the lowest point of the reflector at one end and fall off instead of accumulating as with some bowl-like reflectors.

By proper choice of absorber acceptance aperture and parabolic arc parameters, many different things can be accomplished: (1) Solar energy can be collected throughout the year without moving the reflector or absorber, (2) Solar energy can be collected in the winter and not in the summer without moving any element of the collector, (if no solar energy is needed in the summer the collector will automatically stop collecting then with no moving parts), (3) Arbitrarily high concentrations can be obtained if the reflector is moved on some regular schedule. The more often it is moved, the greater the concentration. Because the acceptance angle decreases with increasing concentration, the necessary frequency of reflector movement increases with concentration. If weekly movement is acceptable, then concentrations greater than ten (10) are possible without the usual necessity to track the sun. Concentrations greater than five (5) are attainable with only eight (8) reflector movements per year. Concentrations greater than three (3) are attainable with only four (4) reflector movements per year.

Dimensional values for the alternate apparatus of FIG. 6 have been calculated, first, for the case where the reflector is moved in some regular schedule yielding high concentration numbers and then for the case where the reflector is moved only twice a year for the sake of convenience. The values are given in terms of the notation of FIG. 6 defined below:

A — the horizontal reflector dimension;
B — the vertical reflector dimension;

C — the distance between the top most portion "b" of the reflector and the bottom surface of the absorption means;

D — the horizontal distance between the back of the reflector and the interior edge of the absorption means 510; and E — the absorber width.

EXAMPLE I

For the case where the difference between the angle θ of FIG. 6 and the angle β' of FIG. 6 is kept at about 5°, the angle β' is always greater than or equal to the angle θ and regular movement of the reflector is required and high concentration numbers result. For example, the reflector 512 is essentially a parabolic cylindrical section with the long dimension of the reflector along the cylindrical axis which is defined as perpendicular to the plane of the paper. The length of the absorption means 510 is about equal to that of the reflector length along the cylindrical axis. If the absorber width E is 0.9 ft., the horizontal reflector dimension A is 10.6 ft., the vertical reflector dimension B is 2.8 ft., the focal length, that is the distance between points "a" and "b" in FIG. 6, is 2.5 ft. and the concentration is about 9.

The procedure for using the apparatus is as follows: On or about 22 Dec., set the reflector 512 parabolic axis θ at the sun's elevation angle and the axis should be oriented in a southerly direction. This can be done without sighting the sun since the sun's elevation angle is known in advance as a function of latitude and time a year; hence, the apparatus could be installed at any time during the year (the date chosen simplifies the exposition). After about 5 weeks (when the solar elevation angle has changed by 5°), the parabolic axis angle θ should be increased by 5° with the distance between the parabola vertex "b" and the outer edge 509 of the absorption means 510 being kept fixed. Secondary reflection 500 is then moved and sections added if needed so that it extends from the absorption means 510 to a point between parabolic focus "a" and the vertex "b" along the parabolic axis. A point close to the focus appears to be optimum. The procedure is repeated each time the elevation angle increases by 5° and is carried out in reverse when the solar elevation angle reaches the peak and descends towards its initial value, with the angle always less than or equal to the angle of FIG. 6. If a variation in concentration from 6 to 10 is acceptable, then the reflector can be moved half as often (every 10°) for the configuration shown.

EXAMPLE II

For the sake of convenience, where it is desired to move the reflector infrequently, the difference between β' and θ can be allowed to reach 25°. In such a case the concentration number is lower and the apparatus dimensions are: absorption means width E, 2.4 ft.; the horizontal reflector dimension A, 7.3 ft.; and the vertical reflector dimension B, 1.8 ft. The parabolic axis θ forms an angle of 26.5° with the horizontal (for use in Philadelphia) and the absorption means is 3.4 ft. above the lowest point on the reflector. The concentration is about 1.7 and the focal length 1.2.

The procedure for using the apparatus is as follows: On or about 22 September, set the reflector's parabolic axis θ at the sun's minimum yearly elevation angle and in a southerly direction. After about six months (when the solar elevation angle has increased by 25° around March 22) the parabolic axis angle should be increased by 25° with the distance between the parabola vertex "b" and the most distant point of the absorber acceptance aperture from the vertex 509 being kept fixed. Secondary reflector 500 is then moved and sections added if needed so that it extends from the absorption means 510 to a point on the parabolic axis between the focus "a" and the vertex "b". A point close to the focus appears to be optimum.

The data of the reflector movement is not critical, two weeks or a month deviation from the optimum changeover date does not significantly degrade the performance.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A radiant solar energy collection apparatus for suppressing convective loss, comprising:
   (a) an absorption means for absorbing solar radiation while minimizing said convective loss, said means comprising:
      (i) an outer shell defining a substantially imperforate downwardly directed cavity and an aperture extending across at least a portion of the lower surface of said cavity;
      (ii) a substantially horizontal absorber means, disposed within said cavity for absorbing incident radiant energy collected within said cavity;
      (iii) insulation means for insulating at least a portion of said cavity, for preventing the transmission of energy therethrough, said means surrounding substantially all portions of said absorber on the top and all sides of said absorber, and extending downwardly below said absorber to at least intersect a substantially horizontal plane spaced below and apart from said absorber; and
      (iv) sheet means disposed below said absorber and within said cavity in said substantially horizontal plane to close said absorber within at least a portion of said cavity;
   (b) an elongate reflecting element fixedly mounted with repsect to said absorption means having a generally parabolic cross-section, said cross-section extending substantially from the vertex of the parabola defined thereby to a point remote from said vertex, said element being disposed substantially beneath said absorption means for directing radiant solar energy upwardly into said cavity through said aperture, said aperture being disposed generally adjacent to the axis of said parabolic cross-section and extending beginning at about the focal point thereof for a preselected distance outwardly along said axis, to collect substantially all of said energy which passes through said axis between said focal point and said preselected outward point along said axis.

2. The invention of claim 1 wherein said reflecting element is mounted to have its parabolic axis disposed at a positive elevation angle less than the solar elevation angle.

3. The invention of claim 1 wherein said point remote from said vertex of said reflecting element is selected so that substantially all rays impinging on said reflecting element pass between said focal point and said preselected outward point.

4. The invention of claim 1 wherein at least a portion of the interior of said cavity comprises a secondary reflector, at least a portion of said reflector being disposed below said sheet means.

5. The invention of claim 4 wherein at least a portion of said secondary reflector extends downwardly from said sheet means.

6. The invention of claim 5 wherein said reflector extends at least to intersect said parabolic axis.

7. The invention of claim 6 wherein said reflector intersects said axis at said focal point.

* * * * *